United States Patent
Zeng et al.

(10) Patent No.: US 8,953,893 B2
(45) Date of Patent: *Feb. 10, 2015

(54) SYSTEM AND METHOD TO DETERMINE FEATURE CANDIDATE PIXELS OF AN IMAGE

(75) Inventors: Mao Zeng, Austin, TX (US); Erich James Plondke, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/602,615

(22) Filed: Sep. 4, 2012

(65) Prior Publication Data

US 2013/0322761 A1    Dec. 5, 2013

Related U.S. Application Data

(60) Provisional application No. 61/653,630, filed on May 31, 2012.

(51) Int. Cl.
*G06K 9/46* (2006.01)

(52) U.S. Cl.
USPC .......................................................... 382/195

(58) Field of Classification Search
USPC .......................................................... 382/195
See application file for complete search history.

(56) References Cited

U.S. PATENT DOCUMENTS

| | | | |
|---|---|---|---|
| 5,144,684 A | 9/1992 | Inada et al. | |
| 5,940,535 A | 8/1999 | Huang | |
| 7,489,834 B2 | 2/2009 | Kloth | |
| 8,121,414 B2 * | 2/2012 | Yoshino | 382/194 |
| 2008/0310729 A1 | 12/2008 | Yoshino | |
| 2011/0222774 A1 * | 9/2011 | Hong et al. | 382/190 |
| 2012/0275711 A1 * | 11/2012 | Inaba et al. | 382/201 |
| 2013/0322762 A1 | 12/2013 | Zeng et al. | |

FOREIGN PATENT DOCUMENTS

GB    2446190 A    8/2008

OTHER PUBLICATIONS (Deepak Geetha Viswanathan, "Feature from Accelerated Segment Test (FAST)", 2009; http://homepages.inf.ed.ac.uk/.../AV1FeaturefromAcceleratedSegmentTest.pdf).*
(Edward Rosten, "Machine Learning for High-Speed Corner Detection", 2006, http://citeseerx.ist.psu.edu/viewdoc/download?doi=10.1.1.60.3991&rep=rep1&type=pdf).*
International Search Report and Written Opinion—PCT/US2013/043417—ISA/EPO—Sep. 20, 2013.

(Continued)

*Primary Examiner* — Stephen R Koziol
*Assistant Examiner* — Totam Le
(74) *Attorney, Agent, or Firm* — Peter Michael Kamarchik; Nicholas J. Pauley; Joseph Agusta (57) ABSTRACT

A system and method of processing an image is disclosed. A particular method of determining whether a particular pixel of an image is a feature candidate includes receiving data corresponding to a subset of a plurality of pixels surrounding the particular pixel. Each of the plurality of pixels may be from the image. The method further includes excluding the particular pixel from consideration as a feature candidate based on a comparison of values of the data to a comparison value. The comparison value may be based on an attribute value of the particular pixel and a threshold attribute value.

29 Claims, 8 Drawing Sheets

(56) References Cited

OTHER PUBLICATIONS

Kraft M., et al., "System on Chip Coprocessors for High Speed Image Feature Detection and Matching", Aug. 22, 2011, Advances Concepts for Intelligent Vision Systems, Springer Berlin Heidelberg, Berlin, Heidelberg, pp. 599-610, XP019161128, ISBN: 978-3-642-23686-0.

Rosten E., et al., "Faster and Better: A Machine Learning Approach to Corner Detection", Transactions on Pattern Analysis and Machine Intelligence. IEEE. Piscataway, USA, vo 1.32. No. 1. Jan. 1, 2010, pp. 105-119, XP011321483, ISSN: 0162-8828. DOI: 10.1109/TPAMI.2008.275.

Miroslav T., et al., "Fast Corner Detection", Image and Vision Computing, 1998, pp. 75-87.

\* cited by examiner

SYSTEM AND METHOD TO DETERMINE FEATURE CANDIDATE PIXELS OF AN IMAGE

I. CLAIM OF PRIORITY

This application claims priority from U.S. Provisional Patent Application No. 61/653,630, filed May 31, 2012, entitled "SYSTEM AND METHOD TO DETERMINE FEATURE CANDIDATE PIXELS OF AN IMAGE," the contents of which are incorporated by reference in its entirety.

II. FIELD

The present disclosure is generally related to image processing.

III. DESCRIPTION OF RELATED ART

Products having facial recognition applications, gesture control interfaces, and augmented reality applications depend on computer vision algorithms that provide methods for acquiring, processing, and analyzing images. One aspect of computer vision is feature detection that involves processing of image information at points within an image to identify points of interest within the image. Feature detection based on a Features from Accelerated Segment Test ("FAST")-type algorithm (e.g., FAST9, FAST10, FAST11, FAST12, etc.) analyzes a set of pixels that form a circle surrounding a candidate pixel.

A software implementation of a feature detection algorithm may have limited efficiency for processing an image. For example, a software implementation of a feature detection algorithm may have numerous lines of code and may involve execution of many compare instructions, conditional branch instructions, and jump instructions. Thus, a significant amount of processing time and processor resources may be consumed to execute the software implementation of the feature detection algorithm. Data level parallelism of a processor may be limited due to a large number of conditional branch instructions of the software implementation of the feature detection algorithm. Additionally, implementing a significant number of compare, conditional branch, and jump instructions on a microprocessor, such as a digital signal processor, can affect execution efficiency due to instruction latency.

IV. SUMMARY

Before an image is processed based on a feature detection algorithm, the image can be preprocessed to determine whether one or more pixels of the image may potentially be considered as a feature of the image (i.e., feature candidate pixels). The preprocessing may exclude other pixels of the image from consideration as feature candidate pixels. Determining whether a pixel is a feature candidate may be referred to herein as coarse feature detection (or coarse detection). A feature candidate is a pixel that is potentially distinguishable (e.g., not excluded) as a feature (e.g., a corner) when processed according to a feature detection algorithm. Processing a feature candidate pixel of the image based on a feature detection algorithm may be referred to herein as fine feature detection (or fine detection).

Coarse detection examines a particular subset of pixels that surround a particular pixel to identify whether the particular pixel is potentially distinguishable as a feature. Many pixels of the image are determined as not potentially distinguishable as a feature when processed according to a feature detection algorithm, and such pixels are excluded by coarse detection. A result of performing coarse detection on the pixels of the image is a subset of the pixels where each pixel of the subset is a feature candidate pixel (i.e., pixels that have not been excluded). Subsequently, fine detection is performed on feature candidate pixels identified by coarse detection, rather than processing all of the pixels of the image. Fine detection may involve applying a feature detection algorithm on the feature candidate pixels. Performing feature detection on the feature candidate pixels as opposed to all of the pixels of the image can improve efficiency during the execution of a feature detection algorithm for an image by reducing an amount of processing performed for an image.

In a particular embodiment, a method includes determining whether a particular pixel of an image is a feature candidate. Determining whether the particular pixel of the image is a feature candidate includes receiving data corresponding to a subset of a plurality of pixels surrounding the particular pixel. Each of the plurality of pixels may be from the image. Determining whether the particular pixel of the image is a feature candidate further includes excluding the particular pixel from consideration as a feature candidate based on a comparison of values of the data to a comparison value. The comparison value may be based on an attribute value of the particular pixel and a threshold attribute value.

In another particular embodiment, an apparatus includes a processor and a memory accessible to the processor. The memory includes instructions that, when executed by the processor, cause the processor to determine whether a particular pixel of an image is a feature candidate. Determining whether the particular pixel of the image is a feature candidate includes receiving data corresponding to a subset of a plurality of pixels surrounding the particular pixel. Each of the plurality of pixels may be from the image. Determining whether the particular pixel of the image is a feature candidate further includes excluding the particular pixel from consideration as a feature candidate based on a comparison of values of the data to a comparison value. The comparison value may be based on an attribute value of the particular pixel and a threshold attribute value.

In another particular embodiment, a non-transitory processor-readable medium stores instructions that, when executed by a processor, cause the processor to determine whether a particular pixel of an image is a feature candidate. Determining whether the particular pixel of the image is a feature candidate includes receiving data corresponding to a subset of a plurality of pixels surrounding the particular pixel. Each of the plurality of pixels may be from the image. Determining whether the particular pixel of the image is a feature candidate further includes excluding the particular pixel from consideration as a feature candidate based on a comparison of values of the data to a comparison value. The comparison value may be based on an attribute value of the particular pixel and a threshold attribute value.

In another particular embodiment, an apparatus for determining whether a particular pixel of an image is a feature candidate includes means for receiving data corresponding to a subset of a plurality of pixels surrounding the particular pixel. Each of the plurality of pixels is from the image. The apparatus further includes means for excluding the particular pixel from consideration as the feature candidate based on a comparison of values of the data to a comparison value. The comparison value is based on an attribute value of the particular pixel and a threshold attribute value.

Particular advantages provided by at least one of the disclosed embodiments include reducing a total amount of processing performed to identify pixels of an image that are features. In particular, performing coarse detection (which may be more efficiently implemented than fine detection) to identify a subset of feature candidate pixels before performing fine detection, instead of performing fine detection on all pixels, may reduce an overall number of operations performed by the feature detection algorithm during fine detection.

Other aspects, advantages, and features of the present disclosure will become apparent after review of the entire application, including the following sections: Brief Description of the Drawings, Detailed Description, and the Claims.

VI. DETAILED DESCRIPTION

Particular embodiments of the present disclosure are described below with reference to the drawings. In the description, common features are designated by common reference numbers throughout the drawings.

Figure 1:
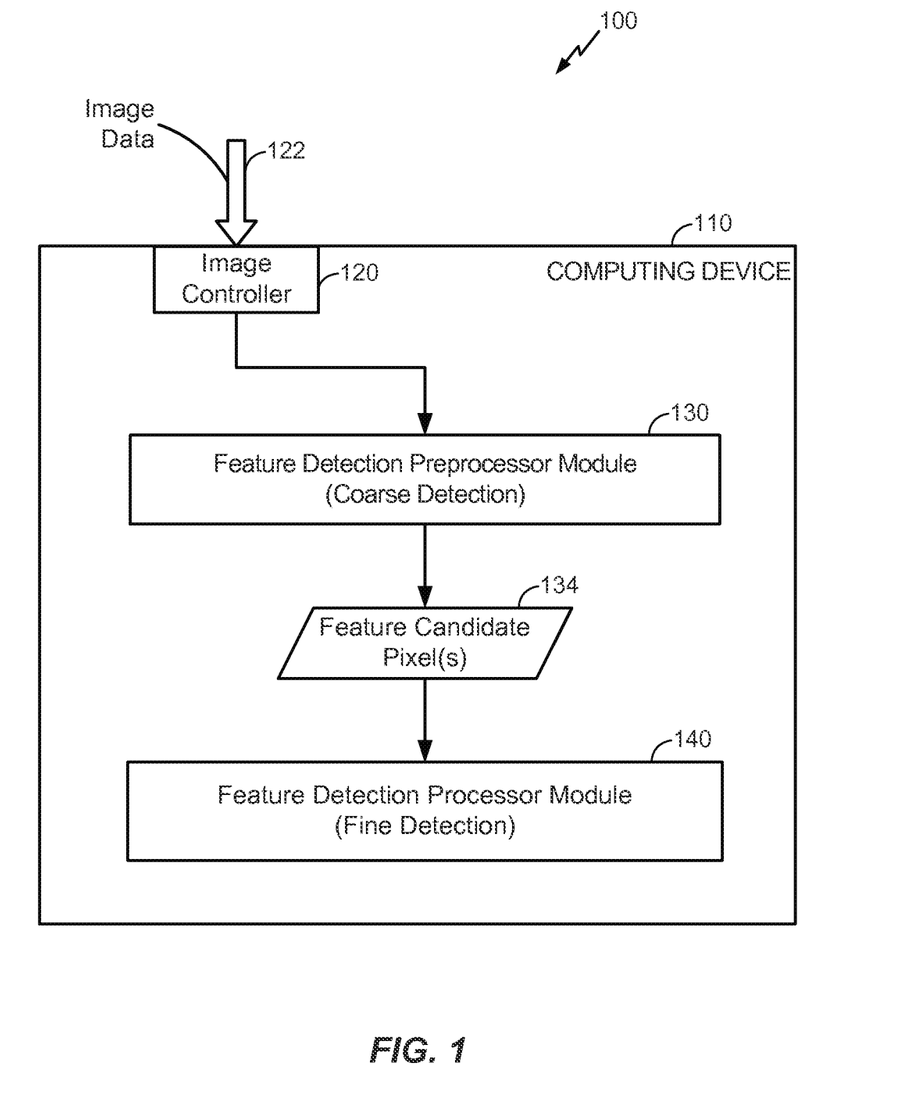
FIG. 1 is a block diagram of a particular embodiment of a system to determine feature candidate pixels of an image.

Referring to FIG. 1, a particular embodiment of a system 100 to determine feature candidate pixels of an image is illustrated. The system 100 includes a computing device 110 that includes an image controller 120 to receive image data 122, such as frames, pixels, or image streams that may represent an image or a portion of an image. The system 100 includes a feature detection preprocessor module 130 and a feature detection processor module 140. The system 100 may be integrated into various electronic devices, including but not limited to a mobile phone, a computing device, a portable electronic device, a tablet computing device, an electronic reader device, a game console, a camera, or peripheral thereof, or a combination thereof.

In particular embodiments, one or more functions or methods described herein as being performed by the feature detection preprocessor module 130 and the feature detection processor module 140 may be implemented using instructions that are executable by a processor of the computing device 110. The instructions executable by the processor may be stored within memory of the computing device 110 or may be in local storage associated with the processor.

In particular embodiments, one or more functions described herein as being performed by the feature detection preprocessor module 130 and the feature detection processor module 140 may be performed by dedicated hardware (e.g., programmable logic arrays, a field-programmable gate array (FPGA) device, an application-specific integrated circuit (ASIC), a processing unit such as a central processing unit (CPU), a digital signal processor (DSP), a microprocessor, an advanced RISC machine (ARM) processor, a controller, another hardware device, a firmware device), software, or any combination thereof.

The feature detection preprocessor module 130 may process pixels of the image data 122 to determine whether one or more of the pixels are feature candidate pixels 134. The one or more feature candidate pixels 134 are pixels that may be potentially distinguishable as a feature (e.g., a corner) of an image when the pixels of the image are processed according to a particular feature detection algorithm. The feature detection preprocessor module 130 may process the image data 122 based on the methods described herein, which may be referred to herein as coarse feature detection (or coarse detection). A pixel that has a distinguishable feature may be identified based on one or more attributes (e.g., intensity, luminescence, hue, chromaticity, brightness, saturation, etc) associated with the pixel. A feature candidate pixel is a pixel that satisfies criteria for coarse detection, which may be defined based on a feature of an image. The criteria for coarse detection may include criteria used to define a feature based on a feature detection algorithm. For illustrative purposes of description, the methods described herein are based on an implementation of the FAST (e.g., FAST9) feature detection algorithm. However, the methods and techniques described herein my be performed based on other feature detection algorithms (e.g., FAST10, FAST11, FAST12, etc.).

In a particular embodiment, the feature detection processor module 140 may process each of the one or more feature candidate pixels 134 identified by the feature detection preprocessor module 130 to determine whether one or more pixels of the one or more feature candidate pixels 134 represent a feature of an image. In particular, the feature detection processor module 140 may perform a feature detection algorithm to process each of the one or more feature candidate pixels 134. For example, the feature detection processor module 140 may determine whether each of the one or more feature candidate pixels 134 is a feature of an image based on FAST. The methods being performed by the feature detection processor module 140 may be referred to herein as fine feature detection (or fine detection).

In operation, the computing device 110 may receive the image data 122. The image data 122 may be received from one or more sources (not shown), which may include, but are not limited to, a camera, an input device, a computing device, or a combination thereof. The image controller 120 may handle receiving the image data 122 for the computing device 110. The image controller 120 may provide the image data 122 to the feature detection preprocessor module 130. The feature detection preprocessor module 130 may perform coarse detection of the image data 122 to determine whether one or more pixels of the image data 122 are feature candidate pixels 134. In a particular embodiment, coarse detection may be concurrently performed for multiple pixels of an image to determine whether each of the multiple pixels is a feature candidate pixel. Concurrent processing of two or more pixels of an image is further described with reference to FIG. 7. The feature candidate pixels 134 may be provided to the feature detection processor module 140 to perform fine detection on the feature candidate pixels 134 to determine whether one or more pixels of the feature candidate pixels 134 are features.

Thus, coarse detection (e.g., performed by the feature detection preprocessor module 130) may improve efficiency in implementation of a selected feature detection algorithm (e.g., performed by the feature detection processor module 140) by reducing an overall number of pixels (i.e. the reduced set of pixels of the image data 122 that qualify as feature candidate pixels 134) to thereby reduce the number of operations to be performed by the selected feature detection algorithm. In a particular embodiment, after coarse detection is performed, the overall number of pixels to be processed by a feature detection algorithm may be reduced significant (e.g., by a factor of 10). As further described with reference to FIG. 7, examination of the pixels during coarse detection may be performed using parallelized vector processing (e.g., of pixels from different rows of the image), which may further improve overall processing efficiency for feature detection.

Figure 2:
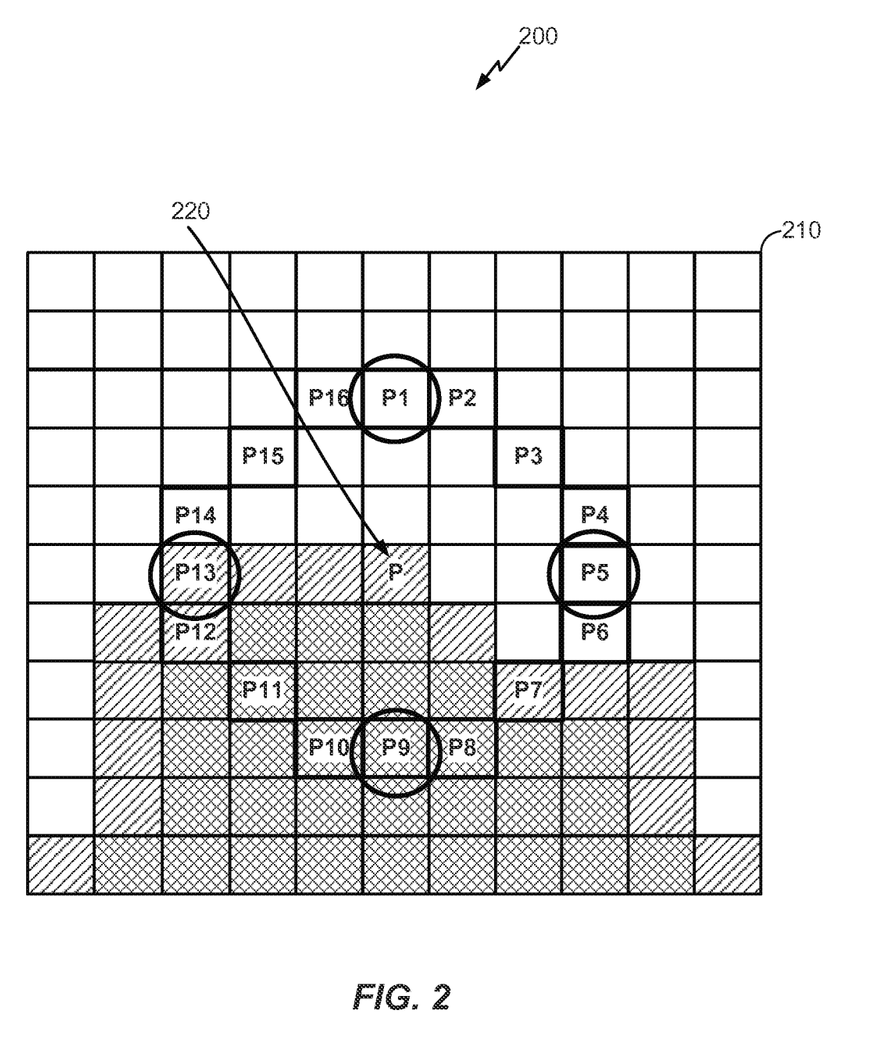
FIG. 2 is a diagram depicting an illustrative example of determining that a pixel of an image is included as a feature candidate for subsequent feature detection processing.

Referring to FIG. 2, a diagram 200 depicts an illustrative example of determining that a pixel is included as a feature candidate for subsequent feature detection processing. For example, such a determination may be made by the feature detection preprocessor module 130 of FIG. 1. A grid 210 of the diagram 200 represents pixels of an image that includes a pixel under test (P) 220 and a plurality of pixels P1-P16 surrounding the pixel 220. In an illustrative embodiment, the grid 210 represents a portion of the image data 122 of FIG. 1. Coarse detection may determine that the pixel 220 is included as a feature candidate for subsequent feature detection processing (e.g., fine detection). A feature candidate may be a pixel that is distinguishable as a feature when processed based on a feature detection algorithm, such as during fine detection.

For purposes of illustration, coarse detection is described based on the FAST9 algorithm. The FAST9 algorithm determines whether a candidate pixel of an image is a feature by analyzing a set of pixels (e.g., 16 pixels) that surround the candidate pixel. When FAST9 is implemented based on a set of 16 pixels, the candidate pixel may be considered a feature when at least 9 contiguous pixels of the set of pixels have an attribute value that differs from the candidate pixel by more than a particular threshold or by less than a particular threshold.

In contrast to the FAST9 algorithm, the coarse detection method described herein may determine whether the pixel 220 may be a feature candidate pixel by processing a subset of the plurality of pixels P1-P16. Which particular pixels are included in the subset of pixels to process may be based on the specific feature detection algorithm that is implemented. For example, the subset may include 4 pixels, such as the circled pixels P1, P5, P9, and P13 in FIG. 2. In the embodiment illustrated in FIG. 2, the subset includes two pixels (P5, P13) that are located in the same row of the grid 210 and two pixels (P1, P9) that are located in the same column of the grid 210.

During coarse detection, an attribute value of each pixel of the subset (P1, P5, P9, P13) may be compared to a comparison value of the pixel 220. In the example shown in FIG. 2, each pixel of the subset (P1, P5, P9, P13) is compared to the pixel 220 based on intensity. For example, the intensity of the pixel 220 and each of the plurality of pixels (P1-P16) may be within a range of values 0-10, where a value of 0 may indicate lowest intensity illustrated by a white pixel background and a value of 10 may indicate highest intensity illustrated by a solid black pixel background. A diagonal grid pixel background P8-P11) may have a value of 6. A diagonal striped pixel background (e.g., pixel 220, P7, P12, and P13) may have a value of 8. Although an intensity range of 0-10 is described for clarity of explanation, other ranges of intensity values (e.g., 0-255) may be used.

During coarse detection, a comparison value may initially be defined based on an attribute value (p) of the pixel under consideration and an adjustable threshold attribute value (b). For example, the attribute value (p) may be an intensity of the pixel 220 (e.g., 8) and the threshold attribute value (b) may be an intensity threshold (e.g., 2). The example in FIG. 2 illustrates that the pixel 220 is included as a feature candidate for subsequent processing where the feature is defined based on intensity. It will be appreciated that if the pixel 220 were subsequently processed by FAST-based fine detection, the pixel 220 may be identified as a feature because at least 9 contiguous pixels (P1-P6 and P14-P16) have an intensity (e.g., 0) that differs from the intensity of the pixel 220 (e.g., 8) by at least a threshold intensity (e.g., 2).

In a particular embodiment, the comparison value for coarse detection may be defined by a maximum value (p+b) or a minimum value (p−b). The maximum value may be based on a sum of the attribute value (p) and the threshold attribute (b) value (e.g., p+b). The minimum value may be based on a difference of the attribute value (p) and the threshold attribute (b) value (e.g., p−b). Thus, in FIG. 2, the comparison value may be defined by a maximum value of 8+2=10 or a minimum value of 8−2=6. The pixel 220 may be included as a feature candidate when any pair of neighboring pixels, e.g., (P1, P13), (P1, P5), (P5, P9), (P9, P13), in the subset both have intensity values that are greater than the maximum value or less than the minimum value. This embodiment may be illustrated by a conditional statement, which indicates that a particular pixel may be included in consideration as the feature candidate when the conditional statement evaluates as true:

$$(\max(P1,P9) > (p+b) \,\&\&\, \max(P5,P13) > (p+b)) \,||\, (\min(P1,P9) < (p-b) \,\&\&\, \min(P5,P13) < (p-b))$$

Applying the conditional statement to the pixel 220:

$$(\max(0,6) > 10 \,\&\&\, \max(0,8) > 10) \,||\, (\min(0,6) < 6 \,\&\&\, \min(0,8) < 6)$$

The conditional statement evaluates as true because a minimum value of 0 (P1) and 6 (P9) is 0, and a minimum value of 0 (P5) and 8 (P13) is 0, which is less than 6. Thus, the pixel 220 is not excluded from consideration as a feature candidate. Instead, the pixel 220 is included as a feature candidate because each pixel of neighboring pixels P1 and P5 in the subset has an intensity value of 0, which is less than the minimum value.

By performing coarse detection, an overall number of operations performed during feature detection may be reduced because pixels that would otherwise be processed during the feature detection may be excluded, thus eliminating operations performed for the excluded pixels. The number of operations performed for each pixel during coarse detection may be significantly less than the number of operations performed during feature detection. Determining whether to exclude a pixel from consideration as a feature may involve 4 operations to determine a maximum/minimum value for the subset and 4 comparison operations based on a comparison value and may be performed without executing a condition branch instruction.

Figure 3:
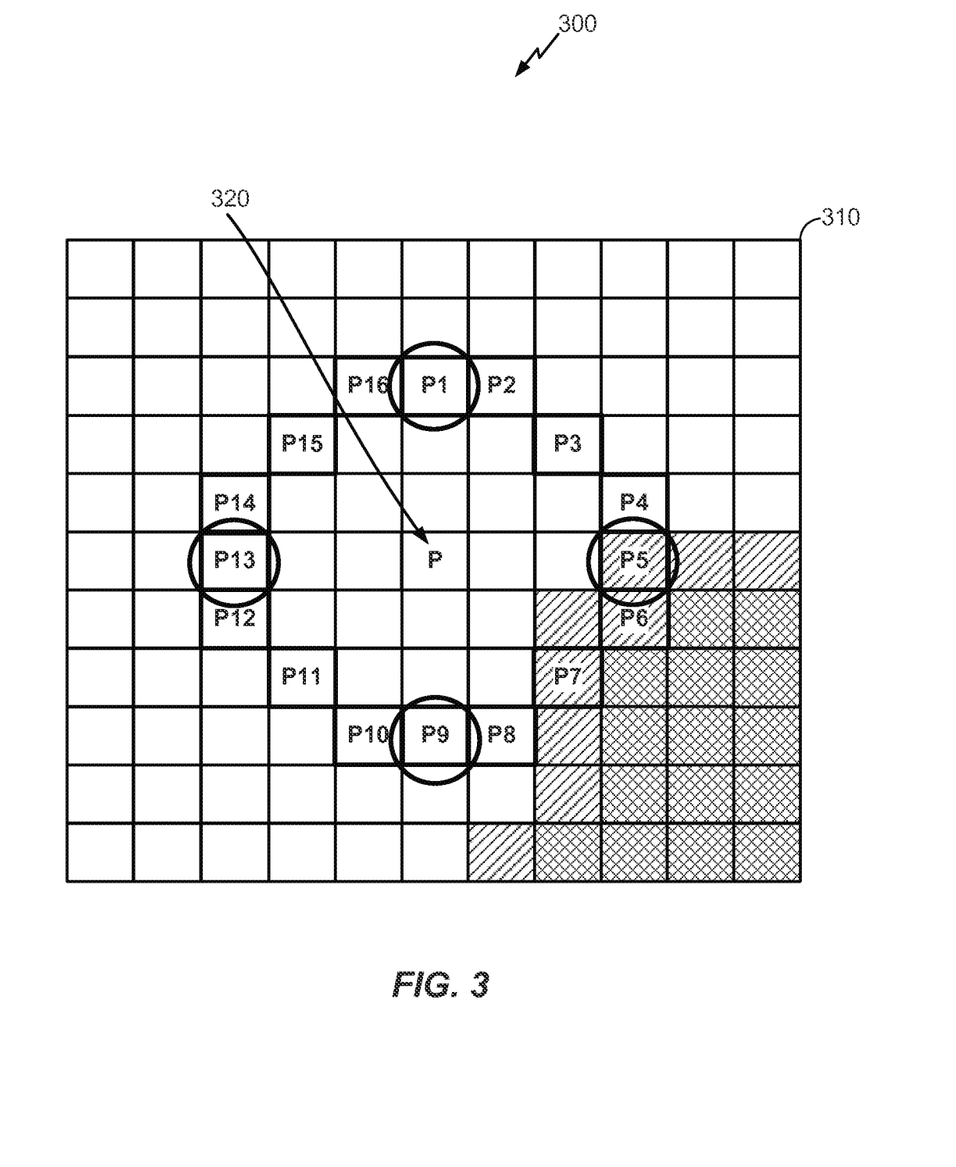
FIG. 3 is a diagram depicting an illustrative example of determining that a pixel of an image is excluded as a feature candidate for subsequent feature detection processing.

FIG. 3 is a diagram 300 of an illustrative example of determining that a pixel of an image is excluded as a feature candidate for subsequent feature detection processing. For example, such a determination may be made by the feature detection preprocessor module 130 of FIG. 1. The grid 310 of the diagram 300 represents pixels of an image that includes a pixel (P) 320 and a plurality of pixels P1-P16 surrounding the pixel 320. In an illustrative embodiment, the grid 310 represents a portion of the image data 122 of FIG. 1. Coarse detection may determine that the pixel 320 is excluded as a feature candidate for subsequent feature detection processing (e.g., fine detection).

During coarse detection, each pixel of a subset (e.g., circled pixels P1, P5, P9, P13) of the plurality of pixels (P1-P16) may be compared to a comparison value of the pixel 320. For example, the intensity of the pixel 320 and each of the plurality of pixels (P1-P16) may be within a range of values 0-10, where a value of 0 may indicate lowest intensity illustrated by a white pixel background and a value of 10 may indicate highest intensity illustrated by a solid black pixel background. A diagonal grid pixel background may have a value of 6. A diagonal striped pixel background (e.g., P5-P7) may have a value of 8. Thus, the pixel 320 has a value of 0. The attribute value (p) may be an intensity of 0 and the threshold attribute value (b) may be an intensity threshold of 2. Although an intensity range of 0-10 is described for clarity of explanation, other ranges of intensity values (e.g., 0-255) may be used. FIG. 3 illustrates that the pixel 320 is excluded as a feature candidate when the feature is defined based on intensity.

As described with reference to FIG. 2, the comparison value used during coarse detection may be based on a maximum value or a minimum value. For example, the comparison value may be defined by the maximum value (p+b) or the minimum value (p−b). In FIG. 3, the comparison value may be defined by a maximum value of 2 or a minimum value of −2. Based on the maximum value and the minimum value, the pixel 320 is included in consideration as the feature candidate when the conditional statement described with reference to FIG. 2, reproduced below, evaluates as true:

$$(\max(P1,P9)>(p+b)\&\&\max(P5,P13)>(p+b))\|(\min(P1,P9)<(p-b)\&\&\min(P5,P13)<(p-b))$$

Applying the conditional statement to the pixel 320:

$$(\max(0,0)>2\&\&\max(8,0)>2)\|(\min(0,0)<-2\&\&(\min(8,0)<-2)$$

The conditional statement evaluates as false because the maximum value of 0 (P1) and 0 (P9) is 0, which is not greater than 2, and the minimum value of 0 (P1) and 0 (P9) is 0, which is not less than −2. Thus, the pixel 320 is excluded from consideration as a feature candidate. It will be appreciated that the pixel 320 would not be considered a feature when processed by the FAST algorithm during fine detection. In particular, there is not a set of 9 contiguous pixels in the surrounding pixels P1-P16 such that each of the 9 contiguous pixels differs in intensity from the pixel 320 by at least the threshold intensity. As shown in FIG. 3, only three such contiguous pixels exist: P5-P7.

Figure 4:
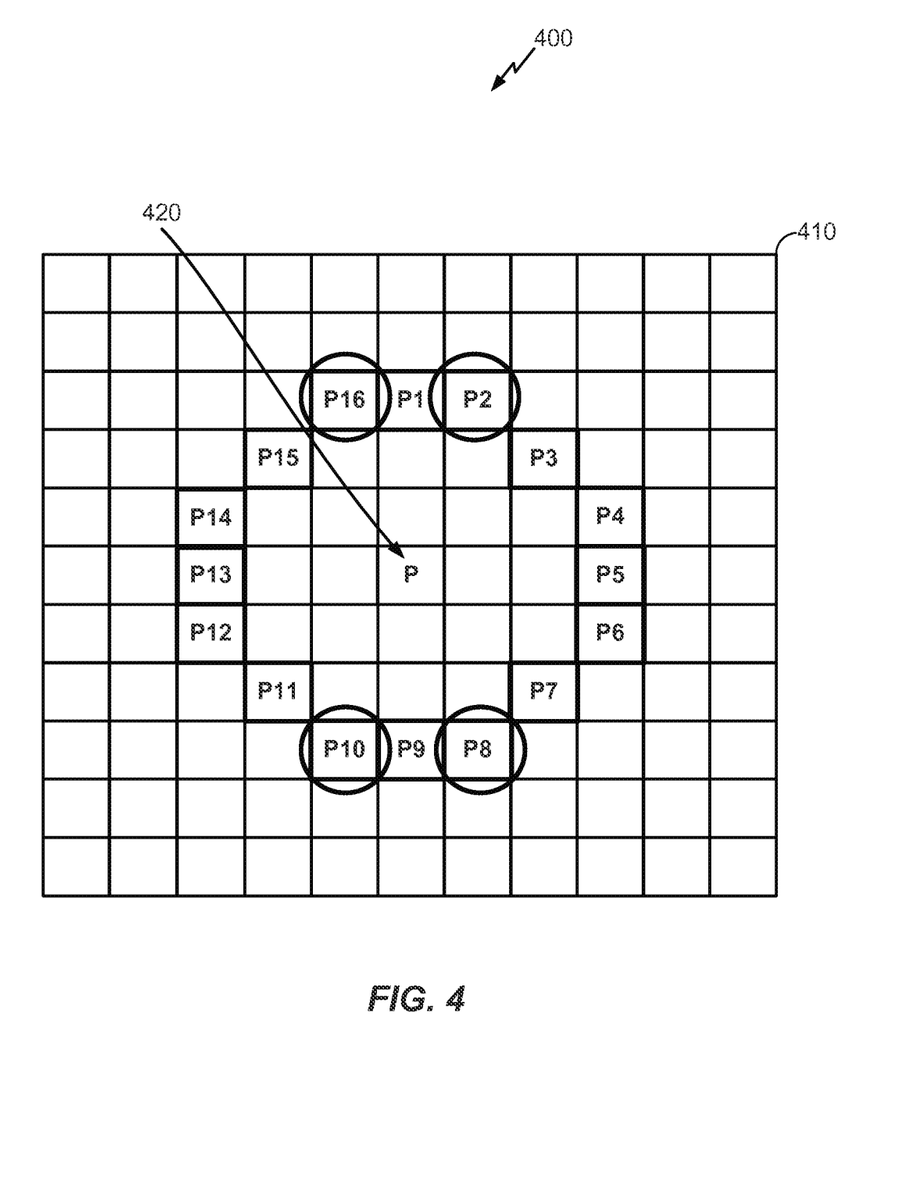
FIG. 4 is a diagram depicting a first illustrative example of pixels that are processed to determine whether a pixel of an image is a feature candidate pixel.
Figure 5:
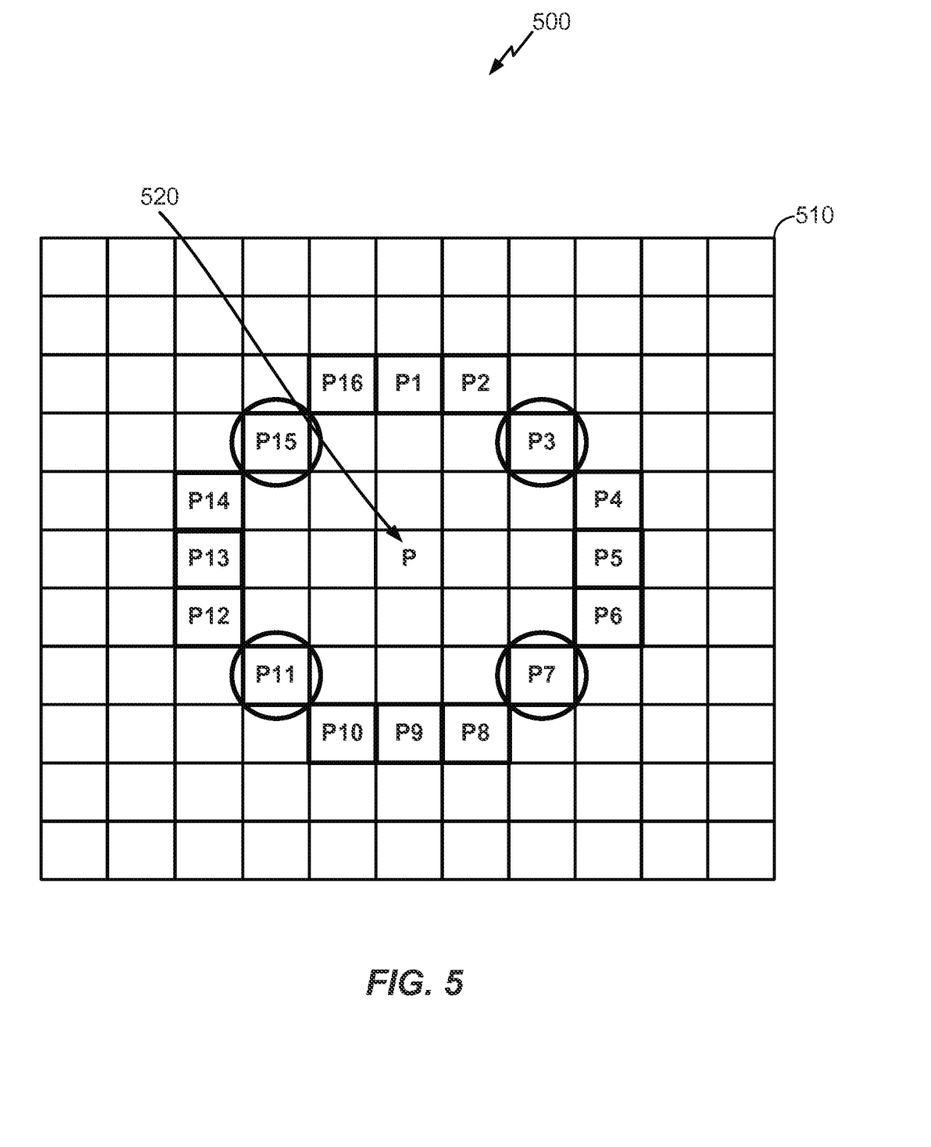
FIG. 5 is a diagram depicting a second illustrative example of pixels that are processed to determine whether a pixel of an image is a feature candidate pixel.
Figure 6:
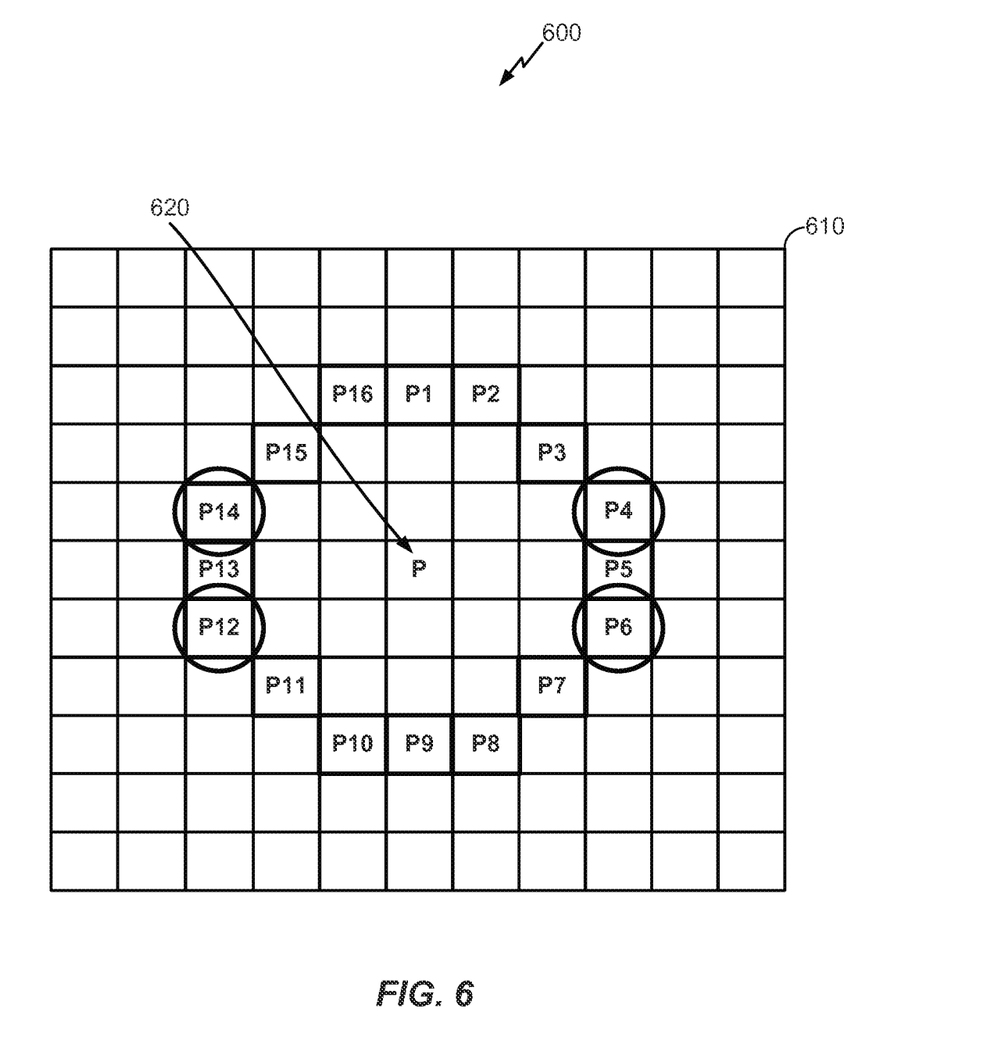
FIG. 6 is a diagram depicting a third illustrative example of pixels that are processed to determine whether a pixel of an image is a feature candidate pixel.

FIGS. 4-6 are diagrams that depict additional examples of selecting a subset of pixels to process via coarse detection to determine whether a pixel surrounded by the subset of pixels is a feature candidate. Each grid (410 of FIG. 4, 510 of FIG. 5, and 610 of FIG. 6) depicted in the FIGS. 4-6 may be similar to the grid 210 of FIG. 2, except that each subset of pixels selected from pixels surrounding a pixel (P) (420 of FIG. 4, 520 of FIG. 5, and 620 of FIG. 6) may vary. Selection patterns other than those shown in FIGS. 2-6 may also be used. For example, any four pixels numbered n1, 4+n2, 8+n1, and 12+n2 may be selected for coarse detection, where n1, n2=1, 2, 3, or 4.

FIG. 4 illustrates a first example of the subset of pixels, the subset including circled pixels P2, P8, P10, and P16. FIG. 5 illustrates a second example of the subset of pixels, the subset including circled pixels P3, P7, P11, and P15. FIG. 6 illustrates a third example of the subset of pixels, the subset including circled pixels P4, P6, P12, and P14. Because the different combinations of subsets of the plurality of pixels (P1-P16) that surround a particular pixel (P1 shown in FIGS. 4-6 are each separated by less than 9 pixels, each such combination may represent a sample subset that, when processed by coarse detection, may provide a sufficiently accurate indication of whether the particular pixel (P) is likely to be distinguishable as a feature by FAST.

Generally, coarse detection may be used to determine whether a pixel under test is a feature candidate based on selecting a subset of pixels $P_{k1}$, $P_{k2}$, $P_{k3}$, and $P_{k4}$ according to a particular pattern described herein. The subset of pixels may be selected using a pattern that is based on an order of the pixels surrounding the pixel under test, where k1<k2<k3<k4. In applying coarse detection, if any pair of neighboring pixels, e.g., ($P_{k1}$,$P_{k2}$) or ($P_{k2}$,$P_{k3}$) or ($P_{k3}$,$P_{k4}$), or ($P_{k4}$,$P_{k1}$) has both pixels with an intensity greater or less than the pixel under test by a threshold, the pixel under test is included as a feature candidate. Coarse detection for the subset can also be simplified by the following conditional statement:

$$(\max(P_{k1},P_{k3})>(p+b)\&\&\max(P_{k2},P_{k4})>(p+b))\|(\min(P_{k1},P_{k3})<(p-b)\&\&\min(P_{k2},P_{k1})<(p-b))$$

Figure 7:
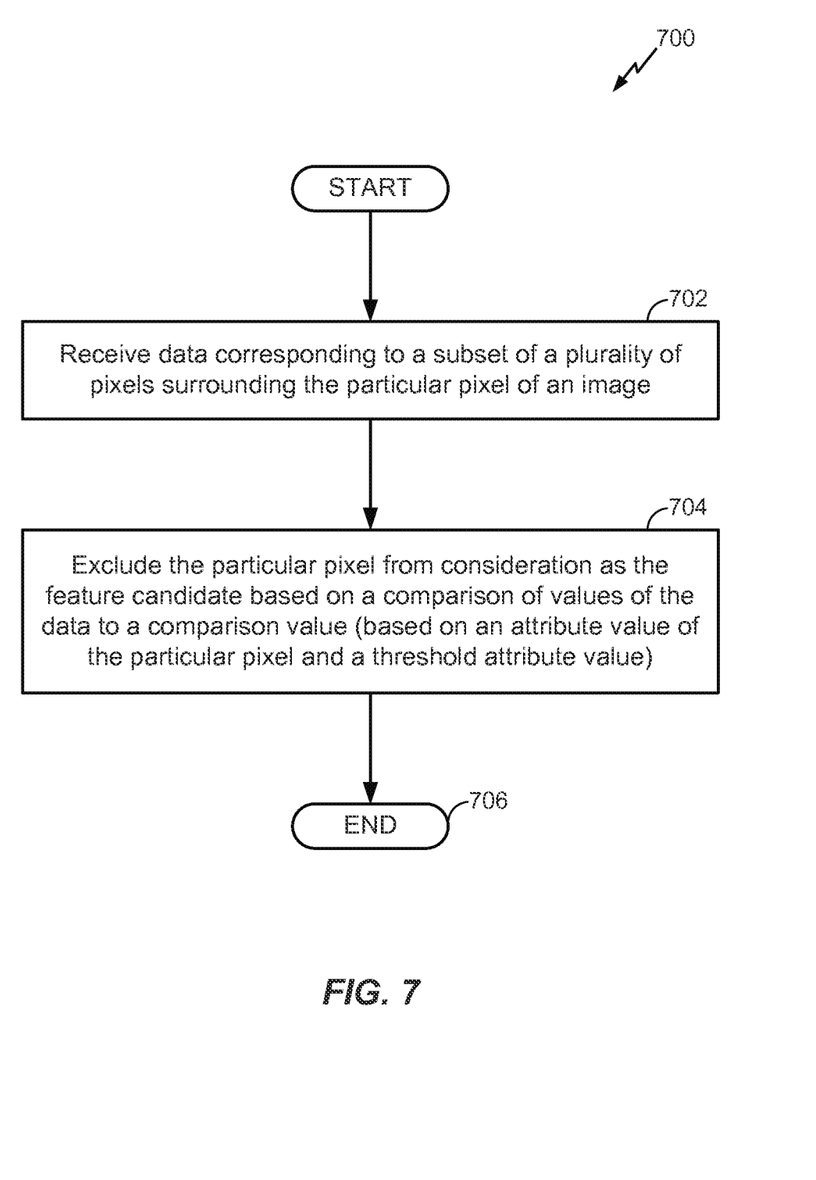
FIG. 7 is a flow chart of an embodiment of a method to determine whether a pixel is a feature candidate of an image.

Referring to FIG. 7, an illustrative embodiment of a method to determine whether a pixel is a feature candidate of an image is depicted and generally designated 700. For example, the method 700 may be performed by the feature detection preprocessor module 130 of FIG. 1. Coarse detection may determine whether a particular pixel of an image is a feature candidate pixel. Data associated with the particular pixel of the image may be included in a portion of the image data 122 received by the feature detection preprocessor module 130 of FIG. 1. The data may include attribute information (e.g., intensity, luminescence, hue, chromaticity, brightness, saturation, etc.) associated with the particular pixel that may be used in association with the method 700.

At 702, the method includes receiving data corresponding to a subset of a plurality of pixels that surround the particular pixel of the image. For example, the feature detection preprocessor module 130 of FIG. 1 may receive the image data 122 of FIG. 1 from the image controller 120 of FIG. 1. The image data 122 may include attribute information for each of the subset of the plurality of pixels. In a particular embodiment, the plurality of pixels may be based on the feature detection algorithm that is implemented for coarse detection. For example, when coarse detection is based on the FAST algorithm, the plurality of pixels may include 16 pixels and 4 of the 16 pixels may be selected as a subset of pixels to be used during coarse detection. In an illustrative example described with reference to FIG. 3, the feature detection preprocessor module 130 of FIG. 1 may receive data correspond to a subset (P1, P5, P9, P13) of the plurality of pixels P1-P16 that surround the particular pixel (320 of FIG. 3). The data may include the intensity information of each pixel of the subset.

In a particular embodiment where the method 700 is performed using vector processing, the data may be received in a vector format that supports vector processing operations or instructions executable by a vector processor. For example, the image data 122 of FIG. 1 may be received as streams of data by the image controller 120 of FIG. 1, such that pixels of an image are received as rows of data. Vector processing may be utilized to process pixels in the image data 122 of FIG. 1 that are received as rows of data. However, the rows of data corresponding to the pixels may have to be aligned into one or more vector data structures that can be processed using vector processing. For example, the image controller 120 of FIG. 1 may arrange the rows of data into one or more vector data structures. The feature detection preprocessor module 130 of FIG. 1 may receive the image data 122 of FIG. 1 from the image controller 120 of FIG. 1 in one or more vector data structures. The vector data structures may include attribute information corresponding to each pixel of the subset with respect to a particular attribute. Each vector data structure may correspond to a particular row of the image and may contain data corresponding to each pixel associated with the particular row.

At 704, the method includes excluding the particular pixel from consideration as the feature candidate based on a comparison of values of the data to a comparison value. For example, the feature detection preprocessor module 130 of FIG. 1 may perform coarse detection and may exclude a particular pixel of the image from consideration as a feature candidate based on a comparison of values of the data corresponding to the subset to a comparison value. The data corresponding to each of the subset of pixels may include a value of an attribute (e.g., intensity, luminescence, hue, chromaticity, brightness, saturation, etc.) for each pixel of the subset. The comparison value my be based on criteria that define a feature candidate for coarse detection. For example, the criteria may be based on an attribute value of the particular pixel (p) and a threshold attribute value (b), where the attribute value is based on a particular attribute that defines the feature candidate. The attribute value (p) may be a value of an attribute (e.g., intensity, luminescence, hue, chromaticity, brightness, saturation, etc.) of the particular pixel. The threshold attribute value (b) may be a threshold that further defines the feature candidate with respect to the attribute. The threshold attribute value may be adjustable.

In another particular embodiment, the comparison value may be defined by a maximum value (p+b) or a minimum value (p−b). The maximum value may be based on a sum of the attribute value (p) and the threshold attribute (b) value (e.g., p+b). The minimum value may be based on a difference of the attribute value (p) and the threshold attribute (b) value (e.g., p−b). The particular pixel may be included as a feature candidate when the conditional statement described with reference to FIGS. 2 and 3 evaluates as true. The pixel 320 of FIG. 3 may be excluded from consideration as the feature candidate when coarse detection is performed for the pixel 320 of FIG. 3 based on when the comparison value is defined by a maximum value of 2 (0+2) or the comparison value is defined by a minimum value of −2 (0−2). The method 700 ends, at 706.

In a particular embodiment, coarse detection may be performed by utilizing vector processing operations to concurrently process two or more consecutive pixels in a row of an image to determine whether each of the two or more pixels is a feature candidate of the image. The vector processing operations may include executing one or more processor-executable instructions that support vector processing. Thus, in a particular embodiment, the method 700 of FIG. 7 may be concurrently executed for each of a plurality of pixels of an image. For example, the method 700 may also include determining whether a second particular pixel of the image is a second feature candidate.

Determining whether the second particular pixel is a second feature candidate may include receiving second data corresponding to a second subset of a second plurality of pixels that surround the second particular pixel of the image. A determination may be made as to whether to exclude the second particular pixel from consideration as the second feature candidate. A second comparison may be performed of values of second data to a second comparison value associated with the second particular pixel. The second comparison value may be based on a second attribute value of the second particular pixel (2p) and a second threshold attribute value (2b). The second comparison value may be defined by a second maximum value (2p+2b) or a second minimum value (2p−2b). Performing a comparison value of data to the comparison value of the particular pixel (at 704) and performing a comparison of the second data to the second comparison value of the second particular pixel may be performed concurrently.

When the second comparison value is defined by the second maximum value or the second minimum value, the second particular pixel may be included as a feature candidate when the conditional statement described with reference to FIGS. 2 and 3 evaluates as true.

Thus, coarse detection may improve efficiency in implementation of a selected feature detection algorithm to reduce the number of operations to be performed by the selected feature detection algorithm. An amount of pixels processed to determine whether a particular pixel is a feature may be reduced by examining a subset of pixels that surround a particular pixel.

Figure 8:
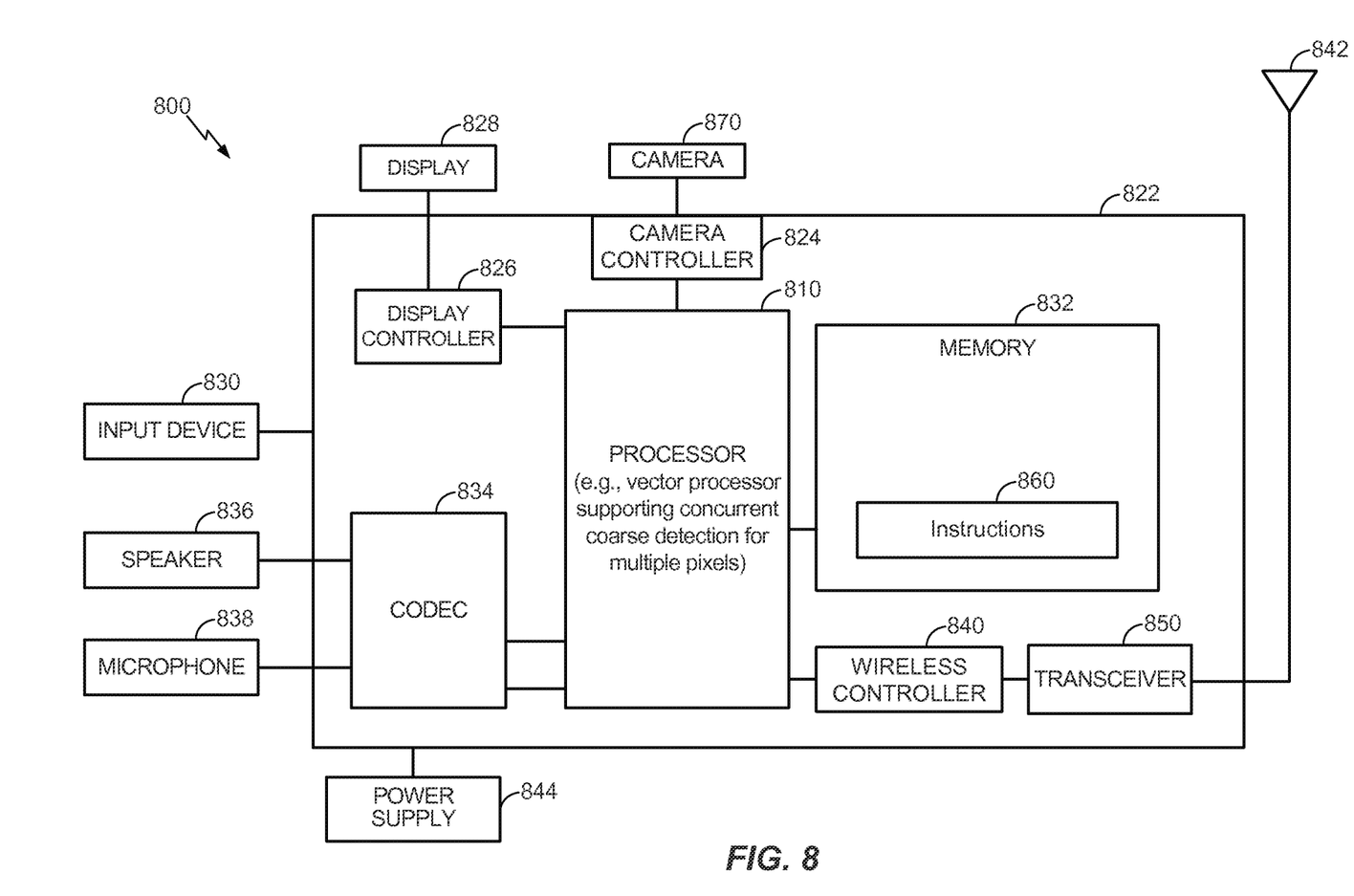
FIG. 8 is a block diagram of a wireless electronic device including components that are operable to determine whether a pixel of an image is a feature candidate pixel.

FIG. 8 is a block diagram of a wireless electronic device including components that are operable to determine whether a pixel of an image is a feature candidate pixel and is depicted and generally designated 800. The wireless electronic device 800 includes a processor 810 coupled to a memory 832. In an illustrative example, the wireless electronic device 800 may include the system 100 of FIG. 1 or components thereof. The wireless electronic device 800 may operate according to one or more of the methods or functions described with reference to FIGS. 1-7.

The processor 810 may include or implement the image controller 120 of FIG. 1, the feature detection preprocessor module 130 of FIG. 1, the feature detection processor module 140 of FIG. 1, or any combination thereof. In a particular embodiment, the processor 810 may include the feature detection preprocessor module 130 of FIG. 1, the feature detection processor module 140 of FIG. 1, or both. For examples, such modules may be integrated into the processor 810 and may include dedicated circuitry or other logic to perform at least a portion of the functionality described with reference to the FIGS. 1-7.

The memory 832 may be a non-transitory, tangible computer-readable and/or processor-readable storage device that stores instructions 860. The instructions 860 may be executable by the processor 810 to include or implement the image controller 120 of RIG. 1, the feature detection preprocessor module 130 of FIG. 1, the feature detection processor module 140 of FIG. 1, or any combination thereof. For example, the instructions 860 may include instructions that may be executable by the processor 810 to perform one or more functions or methods described with respect to the feature detection preprocessor module 130 of FIG. 1, the feature detection processor 140 of FIG. 1, or a combination thereof. The instructions 860 may include instructions that are executable by the processor 810 to cause the processor 810 to perform one or more functions or methods described with reference to FIGS. 2-6, the method 700 of FIG. 7, or a combination thereof. To illustrate, the instructions 860 may include code for determining whether one or more pixels of an image may be a feature candidate pixel. The memory 832 may include instructions that are executable by the processor 810, to perform one or more methods described herein at the wireless electronic device 800. For example, such a wireless interface may be used to send or receive image data that contains one or more pixels of an image. For example, the image data may be the image data 122 of FIG. 1. In other embodiments, one or more functions described herein as being performed by the processor 810 executing instructions from the memory 832 may instead be performed by dedicated hardware (e.g., programmable logic arrays, the FPGA device, the ASIC, a processing unit such as the CPU, the DSP, the microprocessor, the ARM processor, a controller, another hardware device, a firmware device), software, or any combination thereof.

FIG. 8 also shows a display controller 826 that is coupled to the processor 810 and to a display 828. A coder/decoder (CODEC) 834 can also be coupled to the processor 810. A speaker 836 and a microphone 838 can be coupled to the CODEC 834.

FIG. 8 also indicates that a wireless controller 840 can be coupled to the processor 810, where the wireless controller 840 is in communication with an antenna 842 via a transceiver 850. The wireless controller 840, the transceiver 850, and the antenna 842 may represent a wireless interface that enables wireless communication by the mobile communication device 800. The wireless electronic device 800 may include numerous wireless interfaces, where different wireless networks are configured to support different networking technologies or combinations of networking technologies.

FIG. 8 illustrates that a camera 870 may be coupled to a camera controller 824 that may provide image data from the camera 870 to the processor 810. The processor 810 may determine whether one or more pixels of an image represented by the image data is a feature candidate. In a particular embodiment, the camera controller 870 may be the image controller 120 of FIG. 1.

In a particular embodiment, the processor 810, the memory 832, the display controller 826, the camera controller 824, the CODEC 834, the wireless controller 840, and the transceiver 850 are included in a system-in-package or system-on-chip device 822. In a particular embodiment, an input device 830 and a power supply 844 are coupled to the system-on-chip device 822. Moreover, in a particular embodiment, as illustrated in FIG. 8, the input device 830, the speaker 836, the microphone 838, the antenna 842, and the power supply 844 are external to the system-on-chip device 822. However, each of the input device 830, the speaker 836, the microphone 838, the antenna 842, and the power supply 844 can be coupled to a component of the system-on-chip device 822, such as an interface or a controller.

It should be noted that although FIG. 8 depicts a wireless electronic device, the processor 810 and the memory 832 may be integrated into other devices, such as a multimedia player, an entertainment unit, a navigation device, a personal digital assistant (PDA), a mobile personal computer, a smart phone, a fixed location data unit, a computing device (e.g., the computing device 110 of FIG. 1, a tablet computing device, a laptop computing device, a desktop computing device, etc), a media device, or another device configured to process image data.

In conjunction with the described systems and methods, an apparatus is disclosed for determining whether a particular pixel of an image is a feature candidate. The apparatus includes means for receiving data corresponding to a subset of a plurality of pixels surrounding the particular pixel, where each of the plurality of pixels is from the image. For example, the means for receiving may include the processor 810, the feature detection preprocessor module 130 of FIG. 1, another device configured to receive data, or any combination thereof. The apparatus includes means for excluding the particular pixel from consideration as the feature candidate based on a comparison of values of the data to a comparison value, where the comparison value is based on an attribute value of the particular pixel and a threshold attribute value. For example, the means for excluding may include the processor 810, the feature detection preprocessor module 130 of FIG. 1, another device configured to exclude a pixel from consideration as a feature candidate, or any combination thereof. The apparatus may further include means for capturing image data of the image, where the data corresponding to the subset of the plurality of pixels is included in the image data. For example, the means for receiving may include the image controller 120 of FIG. 1, the camera controller 824, another device configured to receive image data, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in the ASIC. The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method of processing an image, the method comprising:

receiving data corresponding to a subset of a plurality of pixels surrounding a particular pixel, wherein each of the plurality of pixels is from the image;

determining whether to exclude the particular pixel from a feature candidate set of pixels, wherein the particular pixel is excluded from the feature candidate set of pixels in response to determining that fewer than two neighboring pixels in the subset have an attribute value that is greater than a first comparison value or less than a second comparison value, wherein the particular pixel is included in the feature candidate set of pixels in response to determining that at least two neighboring pixels in the subset have attribute values that are greater than the first comparison value or less than the second comparison value;

executing a feature detection operation with respect to each pixel in the feature candidate set of pixels; and determining that the particular pixel corresponds to a feature based on a result of the feature detection operation.

2. The method of claim 1, wherein the particular pixel is excluded based on evaluating attribute values of pairs of neighboring pixels in the subset and wherein the attribute values are included in the data corresponding to the subset.

3. The method of claim 1, wherein the first comparison value and the second comparison value are based on an attribute value of the particular pixel and a threshold attribute value, and wherein the attribute value is an intensity value and the threshold attribute value is a threshold intensity value.

4. The method of claim 1, wherein the plurality of pixels includes 16 pixels and the subset includes four pixels of the plurality of pixels.

5. The method of claim 1, wherein determining whether the particular pixel is the feature candidate is performed in a mobile phone, a computing device, a portable electronic device, a tablet computing device, an electronic reader device, a game console, a camera, a peripheral thereof, or a combination thereof.

6. The method of claim 1, further comprising determining whether to exclude a second particular pixel from the feature candidate set of pixels, wherein determining whether to exclude the second particular pixel from the feature candidate set of pixels and determining whether to exclude the particular pixel from the feature candidate set of pixels are concurrently performed using vector processing.

7. The method of claim 1, further comprising determining whether to exclude a second particular pixel from the feature candidate set of pixels by performing a comparison of values of second data to a third comparison value, wherein the second data corresponds to a second subset of a second plurality of pixels surrounding the second particular pixel, wherein each of the second plurality of pixels is from the image, wherein the third comparison value is based on an attribute value of the second particular pixel and a threshold attribute value, and wherein determining whether to exclude the particular pixel from the feature candidate set of pixels and determining whether to exclude the second particular pixel from the feature candidate set of pixels are concurrently performed.

8. The method of claim 1, wherein the feature detection operation is a Features from Accelerated Segment Test (FAST) operation.

9. The method of claim 8, wherein the feature is a corner.

10. An apparatus comprising:
a processor; and
a memory accessible to the processor, the memory including instructions that, when executed by the processor, cause the processor to:
receive data corresponding to a subset of a plurality of pixels surrounding a particular pixel, wherein each of the plurality of pixels is from an image;
determine whether to exclude the particular pixel from a feature candidate set of pixels, wherein the particular pixel is excluded from the feature candidate set of pixels in response to determining that fewer than two neighboring pixels in the subset have an attribute value that is greater than a first comparison value or less than a second comparison value, and wherein the particular pixel is included in the feature candidate set of pixels in response to determining that at least two neighboring pixels in the subset have attribute values that are greater than the first comparison value or less than the second comparison value;

execute a feature detection operation with respect to each pixel in the feature candidate set of pixels; and determine that the particular pixel corresponds to a feature based on a result of the feature detection operation.

11. The apparatus of claim 10, wherein the particular pixel is excluded based on evaluating attribute values of pairs of neighboring pixels in the subset and wherein the attribute values are included in the data corresponding to the subset.

12. The apparatus of claim 10, wherein the first comparison value and the second comparison value are based on an attribute value of the particular pixel and a threshold attribute value, and wherein the attribute value is an intensity value and the threshold attribute value is a threshold intensity value.

13. The apparatus of claim 10, wherein the plurality of pixels includes 16 pixels and the subset includes four pixels of the plurality of pixels.

14. The apparatus of claim 10, wherein the feature is a corner, and wherein the feature detection operation is a Features from Accelerated Segment Test (FAST) operation.

15. The apparatus of claim 10, wherein determining whether the particular pixel is the feature candidate is performed in a mobile phone, a computing device, a portable electronic device, a tablet computing device, an electronic reader device, a game console, a camera, a peripheral thereof, or a combination thereof.

16. The apparatus of claim 10, wherein the instructions, when executed by the processor, cause the processor to determine whether to exclude a second particular pixel from the feature candidate set of pixels, wherein determining whether to exclude the second particular pixel from the feature candidate set of pixels and determining whether to exclude the particular pixel from the feature candidate set of pixels are concurrently performed using vector processing.

17. The apparatus of claim 10, wherein the instructions, when executed by the processor, cause the processor to determine whether to exclude a second particular pixel from the feature candidate set of pixels by performing a comparison of values of second data to a third comparison value, wherein the second data corresponds to a second subset of a second plurality of pixels surrounding the second particular pixel, wherein each of the second plurality of pixels is from the image, wherein the third comparison value is based on an attribute value of the second particular pixel and a threshold attribute value, and wherein determining whether to exclude the particular pixel from the feature candidate set and determining whether to exclude the second particular pixel from the feature candidate set are concurrently performed.

18. The apparatus of claim 10, wherein the feature detection operation is a Features from Accelerated Segment Test (FAST) operation.

19. A non-transitory processor-readable medium storing instructions that, when executed by a processor, cause the processor to:
receive data corresponding to a subset of a plurality of pixels surrounding the particular pixel, wherein each of the plurality of pixels is from an image;
determine whether to exclude the particular pixel from a feature candidate set of pixels, wherein the particular pixel is excluded from the feature candidate set of pixels in response to determining that fewer than two neighboring pixels in the subset have an attribute value that is greater than a first comparison value or less than a second comparison value, and wherein the particular pixel is included in the feature candidate set of pixels in response to determining that at least two neighboring pixels in the subset have attribute values that are greater than the first comparison value or less than the second comparison value;

execute a feature detection operation with respect to each pixel in the feature candidate set of pixels; and determine that the particular pixel corresponds to a feature based on a result of the feature detection operation.

20. The non-transitory processor-readable medium of claim 19, wherein the particular pixel is excluded based on evaluating attribute values of pairs of neighboring pixels in the subset and wherein the attribute values are included in the data corresponding to the subset.

21. The non-transitory processor-readable medium of claim 19, wherein the first comparison value and the second comparison value are based on an attribute value of the particular pixel and a threshold attribute value, and wherein the attribute value is an intensity value and the threshold attribute value is a threshold intensity value.

22. The non-transitory processor-readable medium of claim 19, wherein the plurality of pixels includes 16 pixels and the subset includes four pixels of the plurality of pixels.

23. The non-transitory processor-readable medium of claim 19, wherein determining whether the particular pixel is the feature candidate is performed in a mobile phone, a computing device, a portable electronic device, a tablet computing device, an electronic reader device, a game console, a camera, a peripheral thereof, or a combination thereof.

24. The non-transitory processor-readable medium of claim 19, further storing instructions that, when executed by the processor, cause the processor to determine whether to exclude a second particular pixel from the feature candidate set of pixels, wherein determining whether to exclude the second particular pixel from the feature candidate set of pixels and determining whether to exclude the particular pixel from the feature candidate set of pixels are concurrently performed using vector processing.

25. The non-transitory processor-readable medium of claim 19, further storing instructions that, when executed by the processor, cause the processor to determine whether to exclude a second particular pixel from the feature candidate set of pixels by performing a comparison of values of second data to a third comparison value, wherein the second data corresponds to a second subset of a second plurality of pixels surrounding the second particular pixel, wherein each of the second plurality of pixels is from the image, wherein the third comparison value is based on an attribute value of the second particular pixel and a threshold attribute value, and wherein the instructions, when executed by the processor, cause the processor to concurrently determine whether to exclude the particular pixel from the feature candidate set of pixels and determine whether to exclude the second particular pixel from the feature candidate set of pixels.

26. The non-transitory processor-readable medium of claim 19, further storing instructions that, when executed by the processor, cause the processor to determine whether a second particular pixel is the feature candidate by performing a Features from Accelerated Segment Test (FAST) operation with respect to the particular pixel.

27. The non-transitory processor-readable medium of claim 26, wherein the feature is a corner, and wherein the feature detection operation is a Features from Accelerated Segment Test (FAST) operation.

28. An apparatus comprising:
means for receiving data corresponding to a subset of a plurality of pixels surrounding a particular pixel, wherein each of the plurality of pixels is from an image;
means for determining whether to exclude the particular pixel from a feature candidate set of pixels, wherein the particular pixel is excluded from the feature candidate set of pixels in response to determining that fewer than two neighboring pixels in the subset have an attribute value that is greater than a first comparison value or less than a second comparison value, and wherein the particular pixel is included in the feature candidate set of pixels in response to determining that at least two neighboring pixels in the subset have attribute values that are greater than the first comparison value or less than the second comparison value;
means for executing a feature detection operation with respect to each pixel in the feature candidate set of pixels; and
means for determining that the particular pixel corresponds to a feature based on a result of the feature detection operation.

29. The apparatus of claim 28, further comprising means for capturing image data of the image, wherein the data corresponding to the subset of the plurality of pixels is included in the image data.

* * * * *